United States Patent [19]

Meyerle

[11] 4,420,991
[45] Dec. 20, 1983

[54] DRIVE SYSTEM FOR TRACK-LAYING VEHICLE

[75] Inventor: Michael Meyerle, Meckenbeuren, Fed. Rep. of Germany

[73] Assignee: Zahnradfabrik Friedrichshafen, AG, Friedrichshafen, Fed. Rep. of Germany

[21] Appl. No.: 247,855

[22] Filed: Mar. 26, 1981

[30] Foreign Application Priority Data

Mar. 28, 1980 [DE] Fed. Rep. of Germany ....... 3012220

[51] Int. Cl.³ ............................................. F16H 37/06
[52] U.S. Cl. ..................... 74/682; 74/665 T; 74/677; 74/687; 180/6.44; 180/6.7
[58] Field of Search ............ 74/687, 688, 682, 665 T, 74/665 S, 677, 720.5; 180/6.44, 6.7

[56] References Cited

U.S. PATENT DOCUMENTS

| | | | |
|---|---|---|---|
| 2,757,513 | 8/1956 | Banker | 180/6.7 |
| 3,250,151 | 5/1956 | Binger | 180/6.7 |
| 3,303,723 | 2/1967 | Ruf | 180/6.7 |
| 3,439,559 | 4/1969 | Binger et al. | 180/6.7 |
| 3,543,871 | 12/1970 | Klaue | 180/6.7 |
| 3,938,604 | 2/1976 | Kugler et al. | 74/720.5 |
| 3,966,005 | 6/1976 | Binger | 74/720.5 |
| 4,215,755 | 8/1980 | Waterworth et al. | 180/6.44 |
| 4,258,585 | 3/1981 | Orshansky et al. | 74/687 |
| 4,259,881 | 4/1981 | Meyerle | 74/687 |
| 4,291,592 | 9/1981 | Meyerle et al. | 74/687 |
| 4,304,151 | 12/1981 | Meyerle et al. | 74/687 |
| 4,309,917 | 1/1982 | Leet | 74/687 |

FOREIGN PATENT DOCUMENTS 2739830 3/1979 Fed. Rep. of Germany ....... 180/6.7

Primary Examiner—Lawrence J. Staab
Assistant Examiner—Joseph M. Rolnicki
Attorney, Agent, or Firm—Karl F. Ross; Herbert Dubno

[57] ABSTRACT

A drive system for a track-laying vehicle has a main drive shaft connectable to an engine and to primary inputs of right and left summing transmission having secondary inputs and having outputs connected to the secondary inputs of the summing transmissions so that when the compensating shaft is rotated in one direction the one input is rotated one way and the other the opposite way and vice versa. A planetary-gear transmission has a pair of separate inputs and an output connected to the compensating shaft. A variable speed hydrostatic transmission has its input connected to the main drive shaft and its output connected to one of the inputs of the planetary-gear transmission. A first clutch has one side connected to the output of the hydrostatic transmission and to one input of the planetary-gear transmission and another side connected to the compensating shaft. A second clutch has one side connected to the other input of the planetary-gear transmission and another side operatively connected to the main drive shaft. This first clutch is closed and the second clutch is open for low-range steering, and vice versa for high-range steering for a sharp turn.

10 Claims, 2 Drawing Figures

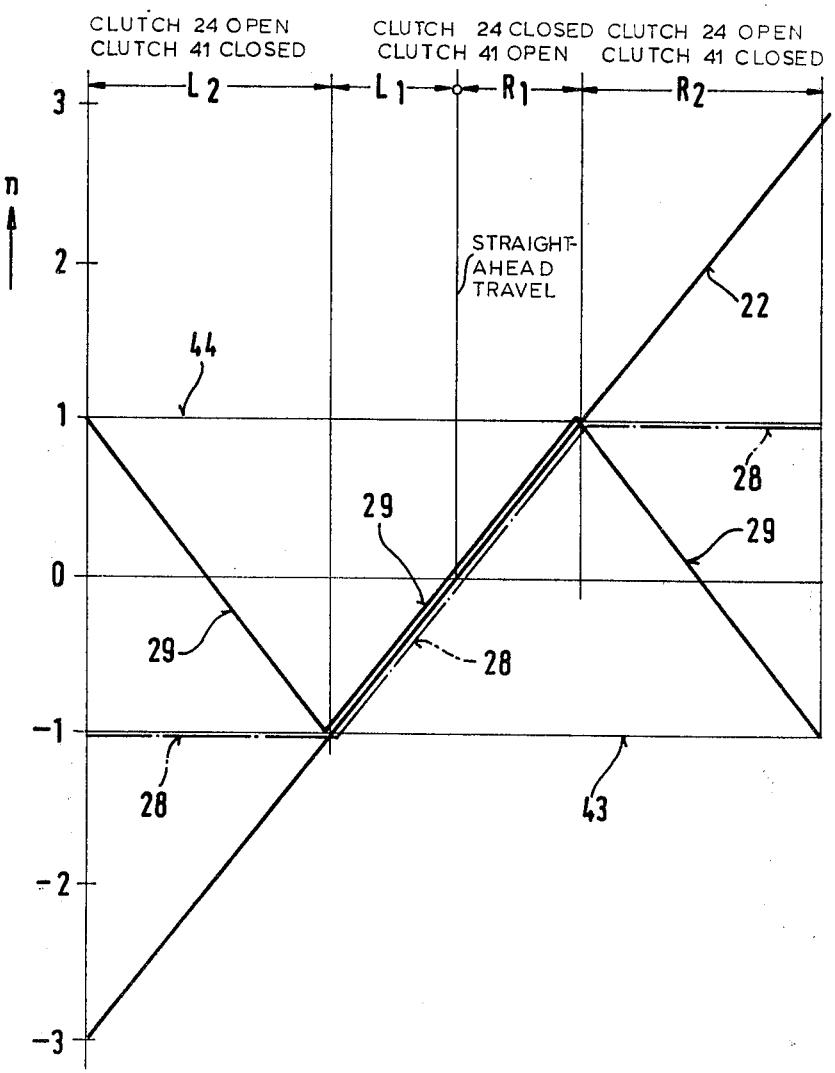

DRIVE SYSTEM FOR TRACK-LAYING VEHICLE

FIELD OF THE INVENTION

The present invention relates to a drive system for a track-laying vehicle such as a caterpillar-type grader or front-loader.

BACKGROUND OF THE INVENTION

It is known to drive a track-laying vehicle with a drive system of the type described in U.S. Pat. No. 3,938,604. With this system, the main drive shaft that is normally continuously rotated by a heavy-duty diesel engine is connected through a fixed-ratio transmission to a pair of output shafts each connected to one input of a respective summing transmission having another input and having an output connected to the respective right or left track. The other inputs of these summing transmissions are connected through appropriate gearing to a so-called compensating shaft, with the gearing set-up so that if the compensating shaft is turned in one direction, one of the inputs is rotated in one direction and the other in the opposite direction and vice versa. Thus, if the compensating shaft is driven in one direction the output of the one summing transmission will rotate more slowly and the output of the other summing transmission more rapidly, and vice versa.

A variable-ratio hydrostatic transmission has an input connected to the main drive shaft and an output connected through an appropriate transmission to the compensating shaft. This hydrostatic transmission normally comprises a pump and a motor, with the pump normally being reversible and of variable volume. Thus, if the control element of this pump is left at the null or central point the compensating shaft is fixed and the outputs of both the summing transmissions will rotate at the same speed for straight-ahead travel of the vehicle. If tripped to one side of the central position the vehicle will veer to one side, and if the control element is tipped to the other side of the central position, the vehicle will veer to the opposite side.

This system works relatively well providing a stepless variation of the speeds of the two tracks for relatively sensitive steering control. Nonetheless the drive system is rather bulky. A four-element planetary-gear transmission is used to connect the output of the hydrostatic transmission to the compensating shaft, and is provided with three separate brakes. As a result of the considerable amount of mechanical parts the system is therefore relatively bulky and expensive to manufacture, and furthermore as a result of the large number of gears that are constantly turning in mesh with one another the losses in such a system are relatively high. What is more, it is difficult to conveniently achieve a relatively wide variation between the rotation rate of the drive gear for the one track relative to that for the other track for a very sharp turn, or even for turning in place.

OBJECTS OF THE INVENTION

It is therefore an object of the present invention to provide an improved drive system for a track-laying vehicle.

Another object is to provide such a drive system which is relatively simple and inexpensive to manufacture, but which nonetheless allows a considerable speed differential between the two tracks to be produced.

SUMMARY OF THE INVENTION

These objects are attained according to the instant invention in a drive system having the main drive shaft connectable to an engine and the primary inputs of right and left summing transmission having secondary inputs, and having outputs connected respectively to right and left tracks. A compensating shaft is connected via appropriate means to the secondary inputs of the summing transmissions for rotation of one of the secondary inputs in one direction and rotation of the other secondary input in the opposite direction on rotation of the compensating shaft in one direction and vice versa. A planetary-gear transmission has a pair of separate inputs and an output connected to the compensating shaft. A hydraulic machine is operatively connected to and driven by the main drive shaft and another hydraulic machine is connected to and drivable by the first mentioned machine and has an output connected to one of the inputs of a planetary-gear transmission. One of these machines has a control element and is of variable volume and the other machine is of constant volume so that these machines form a variable-ratio hydrostatic transmission. A first clutch has one side connected to the output of the other hydraulic machine and to the one input of the planetary-gear transmission and the other side connected to the compensating shaft. A second clutch has one side connected to the other input of the planetary-gear transmission and another side operatively connected to the main drive shaft.

According to the instant invention the clutches are operated alternately so as to produce two separate ranges. In the lower range the first clutch is closed and the second clutch is open so that the hydrostatic transmission is connected substantially directly between the main drive shaft and the compensating shaft. Thus, the transmission will operate in this mode substantially in the same manner as the prior-art structures. In the high range the first clutch is open and the second clutch is closed so that the output of the hydrostatic transmission is connected through the appropriate gearing to the compensating shaft so as to rotate the same at a substantially higher speed for substantially tighter turns by the vehicle according to this invention.

More particularly the planetary-gear transmission has a sun gear constituting its output and connected to the compensating shaft, a ring gear constituting its one input connected with the output of the other hydraulic machine to the one side of the first clutch, and planet gears carried on a planet carrier connectable via the second clutch to the main drive shaft. The gearing is such that the switch-over between low range and high range is effected when the control element of the hydrostatic transmission is at one end position, corresponding to maximum volume of the respective hydraulic machine. Thus, when making a very sharp turn to one side the control element is moved from the central null position all the way over to one side, then the first clutch is opened and the second clutch is closed and the control element is moved back all the way through the null position to the opposite end position to reach the high end of its high range. The opposite procedure is effected for turning to the opposite side.

More particularly, according to this invention the second clutch actually has two clutch members on one side. These clutch members are connected via appropriate bevel gearing to the main drive shaft so that they always rotate oppositely relative to each other but at the same speed. The clutch is of the automatically closing type which connects its other side to whichever of the two clutch members is rotating at the same speed. Thus, this type clutch, which is well known in the art, eliminates the need for a complex controller. The first clutch is normally opened slightly after the second clutch is closed for smooth transition from low range to high range. In fact, a steering-control element is normally provided on the control means for automatic back-and-forth displacement of the control element of the hydrostatic transmission width appropriate opening and closing of the first clutch and opening of the second clutch.

The drive system according to the instant invention can be made relatively compact. The amount of gearing is relatively small as is the number of clutches required. In addition a relatively small hydrostatic transmission can be used while still achieving a wide range of performance due to the automatic two-range setup. Much of the gearing can be made coaxial with the compensating shaft so that the entire system can be very small.

DESCRIPTION OF THE DRAWING

FIG. 2 is a graph illustrating the operation of the system of the present invention.

SPECIFIC DESCRIPTION

Figure 1:
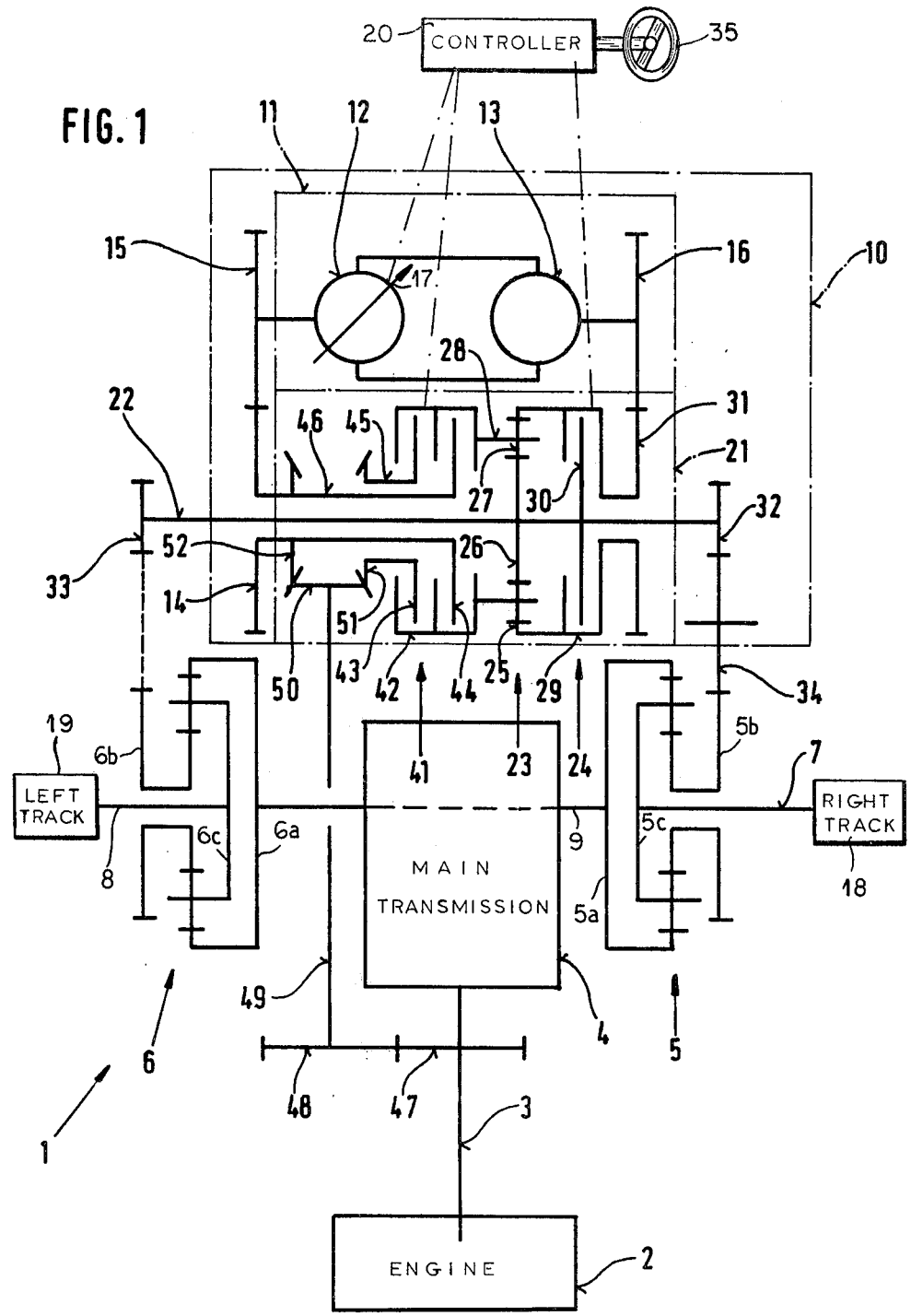
FIG. 1 is a schematic diagram of the drive system according to the instant invention.

A drive system 1 according to the instant invention is operated by an engine 2 normally of the diesel type having an output shaft 3 connected via a standard fixed-ratio main transmission 4 to a drive shaft 9 which is connected on one side via a summing transmission 5 to a shaft 7 connected to a right track 18 and on the other side via a transmission 6 to a shaft 8 connected to the left track 19. The transmissions 5 and 6 are identical and of the planetary-gear type having ring-gear inputs 5a and 6a, sun-gear inputs 5b and 6b and planet-carrier outputs 5c and 6c.

The drive shaft 3 also carries a main drive gear 47 meshing with another gear 48 connected via a shaft 49 to a bevel gear 50 with which meshes a bevel gear 52 carried by a tube shaft 46 rotatable on and coaxial with a compensating shaft 22. Thus, the gear 50 constitutes the input element of a transmission 10 and the compensating shaft 22 the output of this transmission 10. To this end the compensating shaft 22 carries at one end a gear 32 meshing via one gear 34 with the sun-gear input 5b of the summing transmission 5, and at its other end with a gear 33 either meshing directly or via an even number of gears with the sun-gear input 6b of the summing transmission 6. If the shaft 22 is rotated in one direction, therefore, one of the shafts 7 and 8 will rotate faster than the other and vice versa. When the shaft 22 is fixed the two shafts 7 and 8 will rotate at the same speed for straight-ahead travel.

The transmission indicated generally at 10 includes a hydrostatic transmission 11 and a mechanical transmission 21. The hydrostatic transmission 11 includes a variable-volume pump 12, normally of the axial-piston type having a control element 17 normally constituted by the pump swash plate, and connected via a gear 15 to a gear 14 fixed on the tube shaft 46. This pump 12 is connected in closed circuit with a constant-volume hydraulic motor 13, normally also of the axial-piston type and having an output constituted by a gear 16 which meshes with an input gear 31 of the mechanical transmission 21.

The mechanical transmission in turn includes a three-element planetary-gear transmission or assembly 23 having a ring gear 25 centered on the axis of the compensating shaft 22 and angularly fixed to the input gear 31 that meshes with the output gear 16 of the hydrostatic transmission 11. In addition this planetary-gear assembly 23 includes planet gears 27 mounted on a planet carrier 28, and a sun gear 26 fixed on the compensating shaft 22. A first clutch 24 has one side 29 connected to the ring gear 25 and input gear 31 and another side 30 fixed angularly on the compensating shaft 22.

Yet another clutch 41 of the transmission assembly 21 has an outer clutch part 42 angularly fixed to the planet carrier 28, and engageable with either of two input clutch members 43 and 44. The member 44 is fixed on the tube shaft 46 and the member 43 is fixed on an outer tube shaft 45 carried outside the tube shaft 46 and carrying another bevel gear 51 meshing with the gear 50 carried on the shaft 49 that is continuously driven from the drive shaft 3.

A controller 20 is connected to the control element 17 of the pump 12, to the clutch 41, and to the clutch 24. In addition, this controller 20 is connected to a standard steering-wheel control element 35 that is used to operate the system according to the instant invention.

During normal straight-ahead travel as described above, the control element 17 for the pump 12 is in the null position so that the gear 16 and gear 31 are not rotating and the clutch 24 is closed so as to arrest the compensating shaft 22. Thus the inputs 5b and 6b of the summing transmission 5 and 6 will both be arrested and the output shafts 7 and 8 of these transmissions 5 and 6 will rotate at the same speed. This operating condition is illustrated by the center vertical line of FIG. 2 between the zones $L_1$ and $R_1$.

As further shown in FIG. 2 in the low ranges $L_1$ and $R_1$ respectively for left-hand and right-hand turns the clutch 24 remains closed and the clutch 41 is open. As the hydrostatic transmission 11 rotates its output gear 16 in one direction or the other this motion will be transferred directly via the gear 31 and the clutch 24 to the compensating shaft 22 to turn the inputs 5b and 6b of the transmissions 5 and 6 in the appropriate directions for a wide right-hand or left-hand turn. Thus as shown in the graph of FIG. 2 the elements 22, 28 and 29 will all rotate synchronously in these low ranges $L_1$ and $R_1$.

During a medium-sharp right-hand turn, for example, due to the gear ratios, when the control element 17 is all the way over at its end position the clutch member 44 will be rotating at the same angular speed as the planet carrier 28. If the steering element 35 is actuated for a yet sharper right-hand turn the clutch 41 will automatically connect the clutch member 44 to the clutch member 42 and will shortly thereafter automatically open the clutch 24. The controller 20 will then move the control element 17 of the pump 12 back in the opposite direction through the null position. The planetary-gear assembly 23 will, as the input gear 31 is rotated more slowly and then in the opposite direction, regularly increase the rotation rate of the shaft 22 so as to cause the right-track shaft 7 of the transmission 5 to rotate in the forward direction at a substantially greater speed than the shaft 8 of the left track 19. Thus, in this higher range $R_2$ with the clutch 24 open and the clutch 41 closed the planet carrier 28 and clutch member 44 are linked together for synchronous rotation. There is a stepping-up of the rotation from the output of the miotor 13 to the shaft 22.

For a left-hand turn in the higher range $L_2$ substantially the same procedure is followed except that the clutch member 43 and the planet carrier 28 are linked together. The clutch 41 is of the automatically closing type which merely links its outside clutch member 42 to whichever of its input member 43 or 44 is rotating at the same speed.

Thus the system according to the instant invention allows a relatively simple controller 20 to steer the vehicle with a considerable differential in speeds between the right and the left tracks. The controller 20 normally can embody an appropriate cam mechanism which on a continuous displacement of the steering element 35 from one extreme end position to the other will perform the appropriate back-and-forth displacement of the control element 17 with the appropriate opening and closing of the clutch 24 and opening of the clutch 41. The clutch 24 is operated so that it is automatically opened shortly after the clutch 41 is closed, and the clutch 41 is set up so that it is open about when the clutch 24 is closed on returning from the higher ranges $R_2$ and $L_2$ to the lower ranges $R_1$ and $L_1$.

I claim:

1. A drive system for a track-laying vehicle, said system comprising:
   a main drive shaft connectable to an engine;
   right and left summing transmissions having primary inputs operatively connected to said shaft, secondary inputs, and outputs connected respectively to right and left tracks;
   a compensating shaft;
   means operatively connecting said compensating shaft to said secondary inputs of said summing transmissions for rotation of one of said secondary inputs in one direction and rotation of the other secondary input in the opposite direction on rotation of said compensating shaft in one direction and vice versa;
   a planetary-gear transmission having a pair of separate inputs and an output connected to said compensating shaft;
   a hydraulic machine operatively connected to and driven by said main drive shaft;
   another hydraulic machine connected to and drivable by the first-mentioned machine and having an output connected to one of said inputs of said planetary-gear transmission, one of said machines having a control element and being of variable volume and the other machine being of constant volume, whereby said machines form a variable-ratio hydrostatic transmission;
   a first clutch having one side connected to said output of said other hydraulic machine and to said one input of said planetary-gear transmission and another side connected to said compensating shaft; and
   a second clutch having one side connected to the other input of said planetary-gear transmission and another side operatively connected to said main drive shaft.

2. The system defined in claim 1 wherein said planetary-gear transmission has a sun gear constituting its said output and connected to said compensating shaft and a ring gear constituting its said one input connected with said output of said other hydraulic machine to said one side of said first clutch.

3. The system defined in claim 1 wherein said first clutch has a member constituting its said other side and angularly fixed on said compensating shaft.

4. The system defined in claim 1 wherein said second clutch has a pair of clutch members constituting its said other side and independently rotatable relative to each other.

5. The system defined in claim 4 wherein said second clutch has means for connecting said members to said drive shaft for opposite rotation of said members by said drive shaft, said clutch automatically connecting said one side to one of said members when same is rotating at the same speed as said one side.

6. The system defined in claim 5, further comprising control means connected to said control element of said one machine for closing said second clutch when said control element is in a predetermined position.

7. The system defined in claim 6 wherein said means for connecting includes a bevel gear operatively connected to said drive shaft and two further bevel gears meshing with the first-mentioned bevel gear and respectively operatively connected to said members.

8. The system defined in claim 6 wherein said control means opens said first clutch shortly after closing said second clutch.

9. The system defined in claim 1 wherein said summing transmissions are planetary-gear transmissions.

10. The system defined in claim 1 wherein said means operatively connecting said compensating shaft to said secondary inputs includes gearing with the gearing between said compensating shaft and one of said secondary inputs having one more gear than the gearing between the other secondary input and compensating shaft.

* * * * *